United States Patent
Kitaya

(10) Patent No.: US 9,986,161 B2
(45) Date of Patent: May 29, 2018

(54) IMAGE CAPTURING CONTROL APPARATUS AND METHOD FOR CONTROLLING THE SAME

(71) Applicant: CANON KABUSHIKI KAISHA, Tokyo (JP)

(72) Inventor: Koki Kitaya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/423,336

(22) Filed: Feb. 2, 2017

(65) Prior Publication Data
US 2017/0230578 A1    Aug. 10, 2017

(30) Foreign Application Priority Data
Feb. 4, 2016    (JP) .................. 2016-020166

(51) Int. Cl.
*H04N 5/232*    (2006.01)
(52) U.S. Cl.
CPC ..... *H04N 5/23245* (2013.01); *H04N 5/23293* (2013.01); *H04N 5/23212* (2013.01)
(58) Field of Classification Search
CPC ........... H04N 5/23245; H04N 5/23293; H04N 5/23212
See application file for complete search history.

(56) References Cited

U.S. PATENT DOCUMENTS

| | | | | |
|---|---|---|---|---|
| 7,375,755 B2* | 5/2008 | Oya | ................ | H04N 5/23293 348/239 |
| 8,976,270 B2* | 3/2015 | Nonaka | ................ | G06F 1/1626 345/173 |
| 2011/0293245 A1* | 12/2011 | Kudo | ................ | G11B 27/034 386/248 |
| 2015/0234333 A1* | 8/2015 | Yasuda | ............. | G03G 15/5016 399/75 |

FOREIGN PATENT DOCUMENTS

JP    2003-337278 A    11/2003
JP    2011-039206 A    2/2011

* cited by examiner

*Primary Examiner* — Padma Haliyur
(74) *Attorney, Agent, or Firm* — Canon U.S.A., Inc. IP Division

(57) ABSTRACT

An image capturing control apparatus configured to switch between a first mode in which a specific setting relating to image capturing is automatically performed and a second mode in which the specific setting is performed based on an amount of user operation and a control unit configured to perform control, in a case where the first mode is switched to the second mode by a user operation before the image capturing preparation instruction is received, the second mode is not switched to the first mode based on a release of the image capturing preparation instruction, and in a case where the first mode is switched to the second mode by a user operation during the image capturing preparation instruction is being received, the second mode is switched to the first mode based on the release of the image capturing preparation instruction is being received.

19 Claims, 6 Drawing Sheets

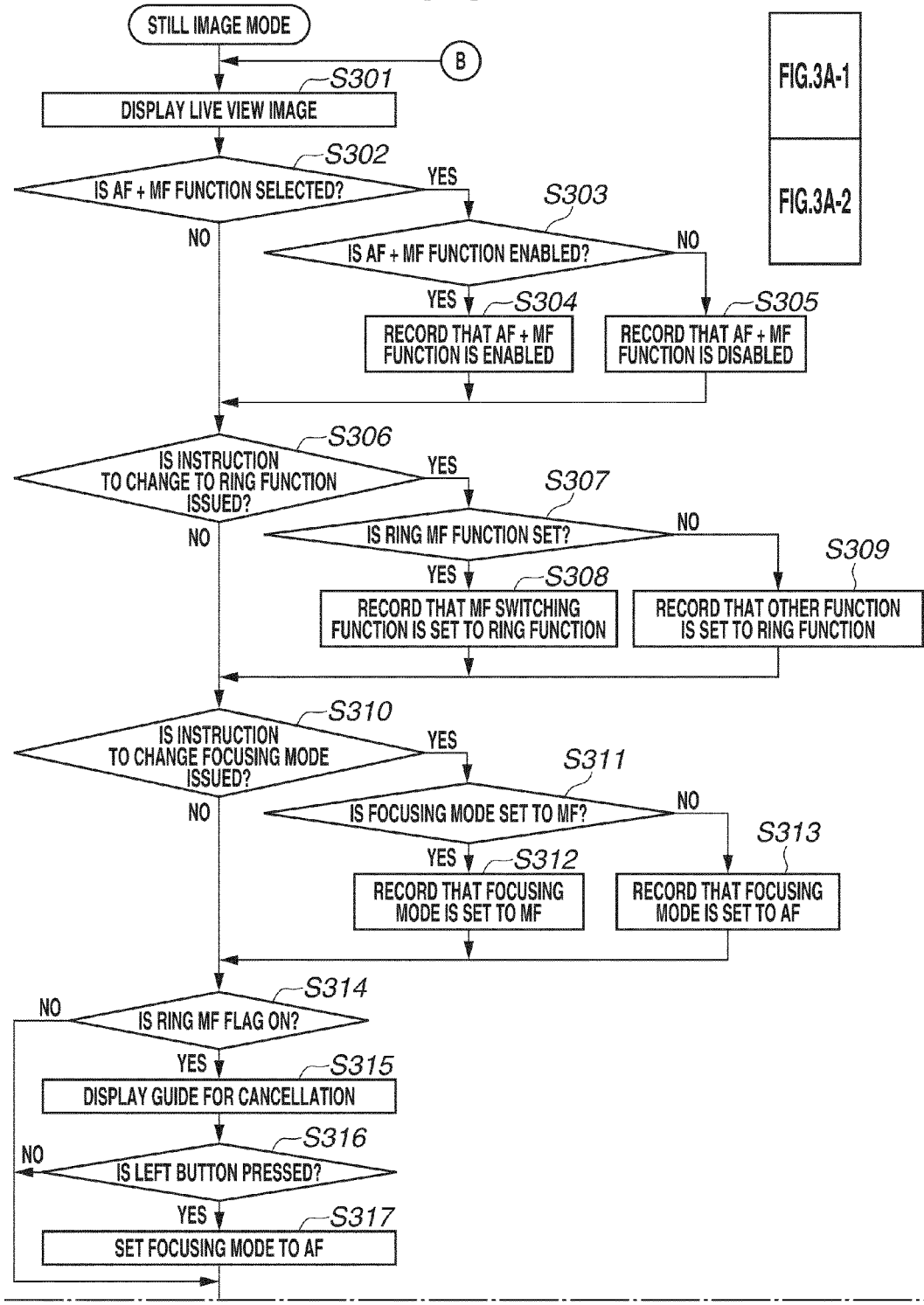

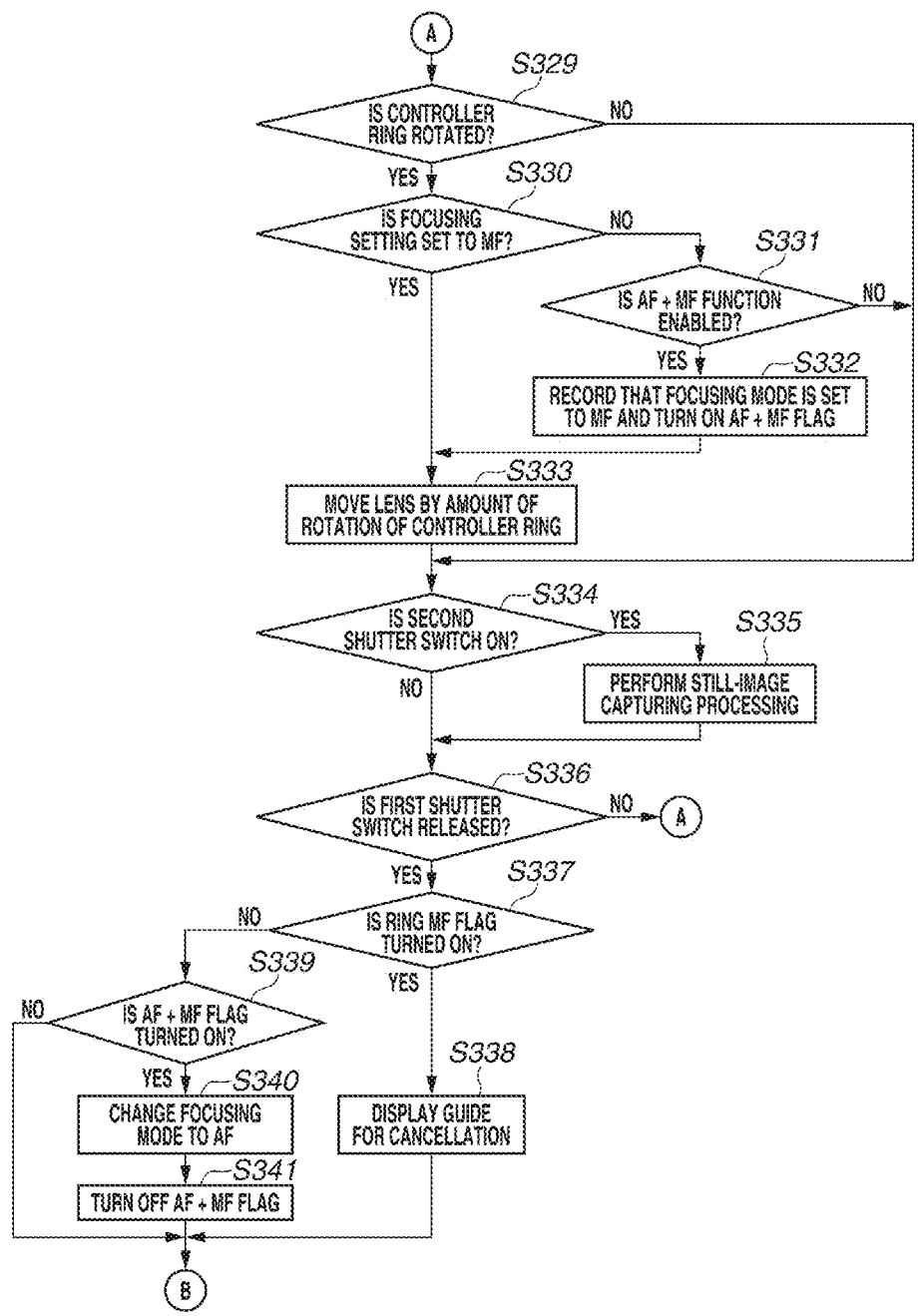

IMAGE CAPTURING CONTROL APPARATUS AND METHOD FOR CONTROLLING THE SAME

BACKGROUND

Field of the Disclosure

The present disclosure relates to an image capturing control apparatus and a method for controlling the image capturing control apparatus, and in particular, to a technique for switching between automatic setting of a specific setting relating to image capturing and setting of the specific setting based on an amount of a user operation.

Description of the Related Art

A technique for switching between automatic setting of a specific setting relating to image capturing and manual setting of the specific setting is known. Japanese Patent Application Laid-Open No. 2011-39206 discusses a technique in which, in a case where an autofocus (AF) mode is set, AF processing is performed in response to an instruction to prepare for image capturing, and while an apparatus is on standby for image capturing and no instruction to prepare for image capturing is given, the AF mode can be switched to a manual focus (MF) mode in response to a ring rotation operation. Japanese Patent Application Laid-Open No. 2003-337278 discusses a technique in which, in a continuous AF mode, the AF adjustment is started when an AF start switch is turned on, and the AF mode is switched to the MF mode with an operation to rotate a focusing ring performed while the AF adjustment is continuously executed. In the technique discussed in Japanese Patent Application Laid-Open No. 2003-337278, after the AF mode is switched to the MF mode by the operation to rotate the focusing ring, the focusing mode is not switched to the AF mode unless the AF start switch is turned on again. As used herein, the term "image capturing" refers to an operation to capture an image with an image sensor and record the captured image.

Meanwhile, there have been demands for, after AF adjustment is executed, switching of the focusing mode to the MF mode immediately before execution of image capturing so that a user can perform precise focus adjustment as desired. However, in the technique discussed in Japanese Patent Application Laid-Open No. 2011-39206, when the switching to the MF mode is performed with the ring rotation operation, switching from the AF mode to the MF mode cannot be performed during the preparation period for image capturing. In the technique discussed in Japanese Patent Application Laid-Open No. 2003-337278, switching to the MF mode can be performed with the focusing ring rotation operation after the AF start switch is turned on to switch to the AF mode. In this technique, however, when a user wishes to set the MF mode only for a temporary period before execution of image capturing, the user needs to operate the AF start switch again in order to return to the AF mode. There may be a case where the user wishes to perform focus adjustment in the MF mode not for a temporary period before execution of image capturing but even in the image capturing standby period or after the image capturing preparation instruction.

SUMMARY

The present disclosure is directed to an image capturing control apparatus capable of enabling manual setting of a specific setting relating to image capturing during a period of time which meets users intention more.

According to an aspect of the present disclosure, an image capturing control apparatus configured to switch between a first setting mode in which a specific setting relating to image capturing is automatically performed and a second setting mode in which the specific setting is performed based on an amount of a user operation performed on a first operation member includes a reception unit configured to receive an image capturing preparation instruction to prepare for image capturing, and a control unit configured to perform control in such a manner that the first setting mode is switched to the second setting mode based on a user operation, wherein in a case where the first setting mode is switched to the second setting mode by a user operation before the reception unit receives the image capturing preparation instruction, the control unit performs control in such a manner that the second setting mode is not switched to the first setting mode when the reception unit is released from a state of receiving the image capturing preparation instruction, and wherein in a case where the first setting mode is switched to the second setting mode by a user operation in a state of the reception unit receiving the image capturing preparation instruction, the control unit performs control in such a manner that the second setting mode is switched to the first setting mode when the reception unit is released from the state of receiving the image capturing preparation instruction.

Further features of the present disclosure will become apparent from the following description of exemplary embodiments with reference to the attached drawings.

BRIEF DESCRIPTION OF THE DRAWINGS

FIG. 3A (consisting of FIGS. 3A-1 and 3A-2) and FIG. 3B are flow charts illustrating a still image mode according to one or more aspects of the present disclosure.

DESCRIPTION OF THE EMBODIMENTS

An exemplary embodiment of the present disclosure will be described in detail below with reference to the accompanying drawings.

It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

An exemplary embodiment of the present disclosure will be described below with reference to the accompanying drawings.

Figure 1A:
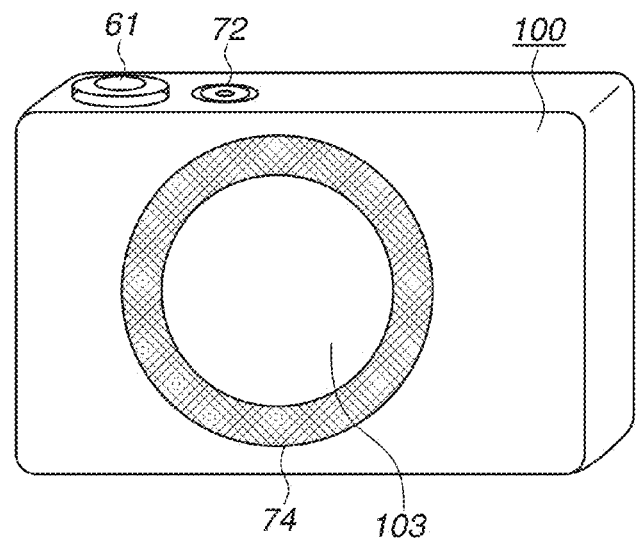
FIGS. 1A and 1B are external views each illustrating a digital camera as an example of an apparatus to which a configuration according to one or more aspects of the present disclosure is applicable.
Figure 1B:
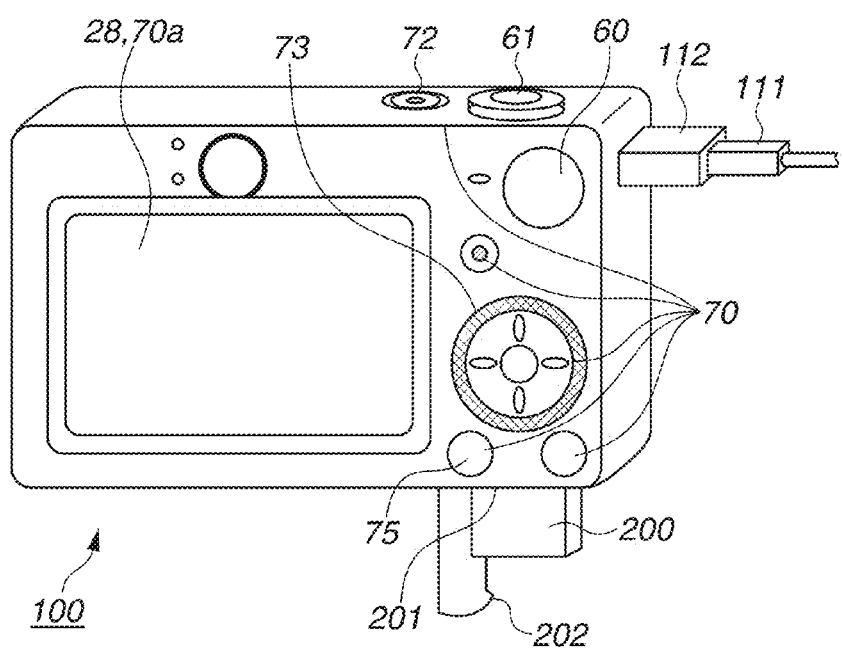

A first exemplary embodiment of the present disclosure will be described below. FIGS. 1A and 1B are external views each illustrating a digital camera 100 as an example of an image capturing control apparatus according to the present exemplary embodiment. A display unit 28 is displays an image and various types of information. A shutter button 61 is an operation unit for a user to give an image-capturing instruction (when the shutter button 61 is pressed, the image-capturing instruction is accepted in a first stage of pressing the shutter button 6, and then image capturing is executed in a second stage of pressing the shutter button 6). A mode selection switch 60 is an operation unit for switching between various types of modes. A connector 112 connects a connection cable 111 for connecting, for example, a personal computer (PC) or a printer to the digital camera 100. An operation unit 70 is an operation unit including operation members such as various switches, buttons, and a touch panel for receiving various user operations. A controller wheel 73 is a rotatable operation member included in the operation unit 70. A power switch 72 is a push button that is pressed to turn on or off the power. A menu button 75 is a button for switching from an image capturing mode to a menu screen (menu mode) or from a reproduction mode to the menu screen. On the menu screen, a focusing mode, etc. can be set. The mode selection switch 60 is a switch for switching between modes such as a still image mode and a moving image mode. A recording medium 200 is a non-volatile recording medium such as a memory card or hard disk. A recording medium slot 201 is a slot for storing the recording medium 200. The recording medium 200 that is stored in the recording medium slot 201 can communicate with the digital camera 100 and perform recording and reproduction. A cover 202 is a cover of the recording medium slot 201. FIG. 1B illustrates a state in which the cover 202 is opened and the recording medium 200 is partially ejected and exposed from the recording medium slot 201. A lens unit 103 includes a lens, and in a case where a lens position is controlled, the position of the lens included in the lens unit 103 is changed, and a focus adjustment can be performed. A controller ring 74 is provided so as to surround the lens unit 103. The controller ring 74 is rotatable along the outer edge of the lens unit 103.

Figure 2:
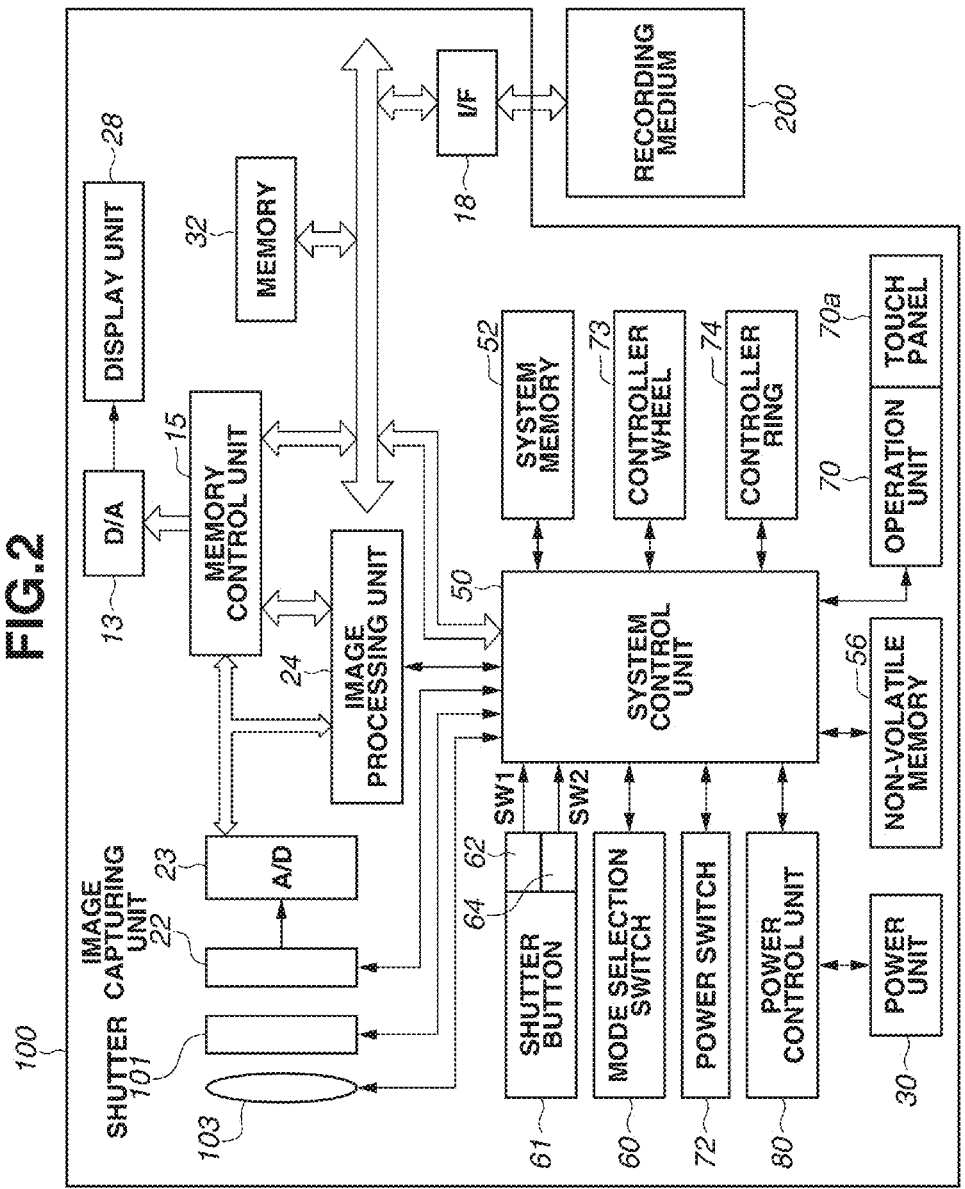
FIG. 2 is a block diagram illustrating an example of a configuration of a digital camera as an example of an apparatus to which a configuration according to one or more aspects of the present disclosure is applicable.

FIG. 2 is a block diagram illustrating an example of the configuration of the digital camera 100 as an example of the image capturing control apparatus according to the present exemplary embodiment. In FIG. 2, the lens unit 103 includes a lens group including a zoom lens and a focus lens. A shutter 101 has a diaphragm function. An image capturing unit 22 is an image sensor, such as a charge-coupled device (CCD) sensor or complementary metal oxide semiconductor (CMOS) sensor, which converts optical images into electric signals. An analog/digital (A/D) conversion unit 23 is used to convert analog signals output from the image capturing unit 22 into digital signals.

An image processing unit 24 performs predetermined pixel interpolation, resizing processing such as reduction processing, and color conversion processing on data from the A/D conversion unit 23 or data from a memory control unit 15. Further, the image processing unit 24 performs predetermined computation processing using captured image data, and based on the obtained computation result, a system control unit 50 performs exposure control and range finding control. In this way, automatic exposure (AE) processing, pre-flashing processing, and automatic focus (AF) processing of a through-the-lens (TTL) method are performed. The image processing unit 24 further performs predetermined computation processing using the captured image data and performs automatic white balance (AWB) processing using the TTL method based on the obtained computation result.

Output data from the A/D conversion unit 23 is directly written to a memory 32 via the image processing unit 24 and the memory control unit 15, or via the memory control unit 15 and not the image processing unit 24. The memory 32 stores image data acquired by the image capturing unit 22 and converted by the A/D conversion unit 23 and image data to be displayed on the display unit 28. The memory 32 has an enough storage capacity to store a predetermined number of still images and a predetermined length of time of moving images and sound.

The memory 32 serves also as an image display memory (video memory). A digital/analog (D/A) conversion unit 13 converts data, for image display, which is stored in the memory 32, into analog signals and feeds the analog signals to the display unit 28. In this way, image data for image display written to the memory 32 is displayed on the display unit 28 via the D/A conversion unit 13. The display unit 28 performs displaying according to the analog signals fed from the D/A conversion unit 13 on a display such as a liquid crystal display (LCD). The digital signals having undergone the A/D conversion by the A/D conversion unit 23 and stored in the memory 32 are converted into analog signals by the D/A conversion unit 13, and sequentially transferred to the display unit 28 to display the resultant data. In this manner, an electronic view finder function is realized to perform through-the-lens image displaying (live view display).

A non-volatile memory 56 is a memory as a recording medium that is electrically erasable, recordable, and readable by the system control unit 50 including a built-in computer. For example, an electrically erasable programmable read-only memory (EEPROM) is used as the non-volatile memory 56. The non-volatile memory 56 stores a constant, a program, etc. for operations of the system control unit 50. As used herein, the term "program" refers to a computer program for executing various flow charts described below in the present exemplary embodiment.

The system control unit 50 controls the digital camera 100. The system control unit 50 realizes processing described below according to the present exemplary embodiment by executing a program recorded on the non-volatile memory 56. A random access memory (RAM) is used as a system memory 52. The constant, variable, program read from the non-volatile memory 56, etc. for operations of the system control unit 50 are loaded into the system memory 52. Further, the system control unit 50 also performs display control by controlling the memory 32, the D/A conversion unit 13, the display unit 28, etc.

The mode selection switch 60, the shutter button 61, and the operation unit 70 are operation units for inputting various operation instructions to the system control unit 50.

The mode selection switch 60 is for switching an operation mode of the system control unit 50 to one of a still image recording mode, a moving image capturing mode, a reproduction mode, etc. Examples of modes included in the still image recording mode include an automatic image capturing mode, an automatic scene discrimination mode, a manual mode, various scene modes for different image capturing settings for different scenes to be captured, a program AE mode, and a custom mode. A user can switch the operation mode directly to one of these modes included in the menu screen using the mode selection switch 60. Alternatively, the user may switch to the menu screen using the mode selection switch 60 and then switch to one of the modes included in the menu screen using another operation member. Similarly, the moving image capturing mode may include a plurality of modes.

A first shutter switch 62 is turned on in the middle of an operation on the shutter button 61 of the digital camera 100, i.e., when the shutter button 61 is half-pressed (image capturing preparation instruction), and generates a first shutter switch signal SW1. In response to the first shutter switch signal SW1, operations such as the AF processing, AE processing, AWB processing, and pre-flashing processing are started.

A second shutter switch 64 is turned on when the operation on the shutter button 61 is completed, i.e., when the shutter button 61 is completely pressed (image capturing instruction), and generates a second shutter switch signal SW2. In response to the second shutter switch signal SW2, the system control unit 50 starts a series of operations of image capturing processing including a still image capturing operation by the image capturing unit 22, operations from an operation to read signals from the image capturing unit 22 to an operation to write image data to the recording medium 200.

Functions are assigned to the respective operation members of the operation unit 70 as appropriate for each occasion by an operation for selecting an icon from various function icons displayed on the display unit 28, so that the operation members act as various function buttons. Examples of the function buttons include an end button, return button, image feed button, jump button, depth-of-field preview button, and attribute change button. For example, when a menu button is pressed, a menu screen via which various settings can be set is displayed on the display unit 28. The user can intuitively set various settings using the menu screen displayed on the display unit 28 and four-direction buttons including upward, downward, rightward, and leftward directions and "SET" button.

The controller wheel 73 is a rotatable operation member included in the operation unit 70. The controller wheel 73 is used to, for example, specify an item to be selected, as well as the direction buttons (a cross key including left, right, up, and down buttons).

The controller ring 74 is a rotatable operation member provided along the outer edge of the lens unit 103. Rotation operation performed on the controller wheel 73 and the controller ring 74 generates electrical pulse signals according to the amount of the rotation operation, and the system control unit 50 controls respective members of the digital camera 100 based on the pulse signals. The angle of the rotation operation, the number of rotations made, etc. can be determined based on the pulse signals. The controller wheel 73 and the controller ring 74 may be any operation members from which a rotation operation can be detected. For example, the controller wheel 73 and the controller ring 74 each may be a dial operation member that itself rotates according to a user rotation operation and generates a pulse signal. Since the controller ring 74 is provided along the outer edge of the lens unit 103, the user can easily rotate the controller wheel 73 and the controller ring 74 even while holding the digital camera 100. Further, the user can easily operate the controller ring 74 even while looking through an eyepiece (not illustrated in FIGS. 1A and 1B) to capture an image. Functions such as white balance adjustment, switching to manual focusing, zoom adjustment, or International Organization for Standardization (ISO) sensitivity adjustment can be assigned to the controller wheel 73 and the controller ring 74. Further, a function to be assigned can be set according to each mode such as the manual mode, an aperture priority mode (Av mode), a shutter speed priority mode (Tv mode), and program (P) mode.

A power control unit 80 includes a battery detection circuit, a direct current (DC)-DC converter, and a switch circuit configured to switch a block to which power is to be supplied. The power control unit 80 detects whether a battery is attached, a battery type, and a remaining battery level. The power control unit 80 controls the DC-DC converter based on the detection result(s) and an instruction from the system control unit 50, and supplies a necessary voltage to each member including the recording medium 200 for a necessary period of time. The power switch 72 notifies the system control unit 50 that the state is changed to an on or off state when the power switch 72 is switched.

A power unit 30 includes a primary battery such as an alkaline battery or lithium battery, a secondary battery such as a nickel-cadmium (NiCd) battery, a nickel-metal hydride (NiMH) battery, or lithium (Li) battery, and an alternating current (AC) adaptor. A recording medium interface (I/F) 18 is an interface for the recording medium 200 such as a memory card or hard disk. The recording medium 200 is a non-volatile recording medium such as a memory card configured to record images at the time of image capturing, and includes a semiconductor memory, optical disk, or magnetic disk.

Figures 2, 3A:
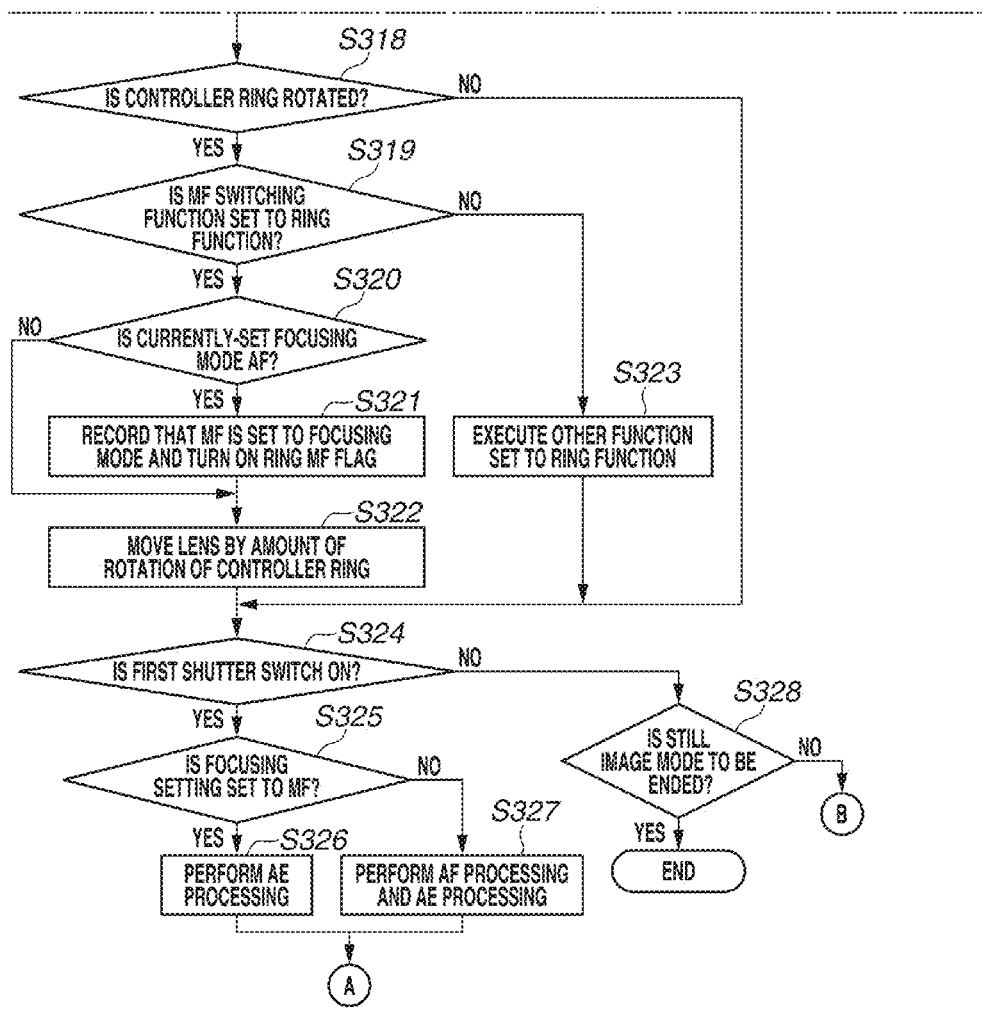

A description is given of processing in the still image mode according to the present exemplary embodiment with reference to FIGS. 3A and 3B. A program recorded on the non-volatile memory 56 is loaded into the system memory 52 and executed by the system control unit 50 to realize the processing. The processing is started when the power of the digital camera 100 is switched on and ready to capture a still image.

In step S301, the system control unit 50 displays a live view image 401 on the display unit 28 as illustrated in FIGS. 4A to 4H.

In step S302, the system control unit 50 determines whether the user selects an item of an autofocus (AF)+manual focus (MF) function (function in which rough focus adjustment is performed through the AF function and precise focus adjustment is performed by a user using the MF function). The item regarding the AF+MF function can be selected on the menu screen. If the system control unit 50 determines that an operation to open the menu screen is performed and the AF+MF function is selected (YES in step S302), the processing proceeds to step S303. If the system control unit 50 determines that the AF+MF function is not selected (NO in step S302), the processing proceeds to step S306.

In step S303, the system control unit 50 determines whether the setting of the AF+MF function is set to be enabled. The setting of the AF+MF function is enabled if the item of the AF+MF function is selected on the menu screen and then "ON" is selected by a user operation. If the system control unit 50 determines that the setting of the AF+MF function is set to be enabled (YES in step S303), the processing proceeds to step S304. On the other hand, if the system control unit 50 determines that the setting of the AF+MF function is not set to be enabled (if the AF+MF function is set to "OFF" or disabled) (NO in step S303), the processing proceeds to step S305.

Figure 4A:
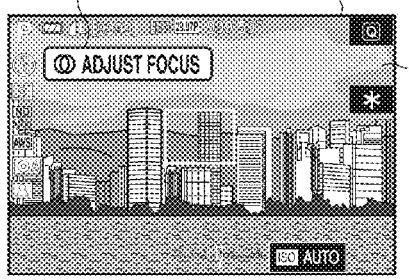
FIGS. 4A to 4H each illustrate an example of what is displayed on a display unit according to one or more aspects of the present disclosure.
Figure 4E:
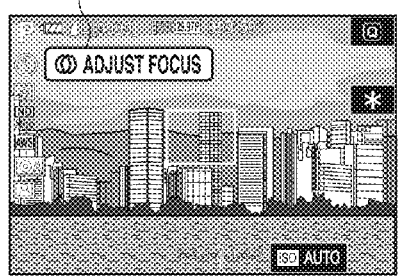

In step S304, the system control unit 50 records on the non-volatile memory 56 that the setting of the AF+MF function is enabled. FIGS. 4A and 4E each illustrate a display example during an image capturing standby period in a case where the AF+MF function and a ring MF function are enabled. FIGS. 4E to 4H illustrate an example of a live view screen illustrating a display example at different timings during the preparation for image capturing in a case where the setting is switched from an AF mode to an MF mode using the AF+MF function. As illustrated in FIG. 4E, even when the AF+MF function is enabled, no guide related to the AF+MF function is displayed during the image capturing standby period.

In step S305, the system control unit 50 records on the non-volatile memory 56 that the setting of the AF+MF function is disabled.

In step S306, the system control unit 50 determines whether an instruction to change a function (ring function) to be assigned to the controller ring 74 is given (whether the ring function is selected). During the image capturing standby period, if a FUNC button (not illustrated) included in the operation unit 70 is pressed, the screen is changed to a screen via which the function to be assigned can be changed (set) to the ring function. Alternatively, the ring function may be selectable on the menu screen. If the system control unit 50 determines that an instruction to change to the ring function is given (YES in step S306), the processing proceeds to step S307. If the system control unit 50 determines that an instruction to change the ring function is not given (NO in step S306), the processing proceeds to step S310.

In step S307, the system control unit 50 determines whether an MF switching function is set to the ring function. In addition to the MF switching function, Tv, Av, ISO sensitivity, or exposure compensation function can be assigned to the ring function. The controller ring 74 that is operated (rotated) executes a selected function. If the system control unit 50 determines that a setting change is made to assign the MF switching function to the ring function (YES in step S307), the processing proceeds to step S308. On the other hand, if the system control unit 50 determines that no setting change is made to assign the MF switching function to the ring function (NO in step S307), the processing proceeds to step S309. While a function is assigned to the controller ring 74 in the present exemplary embodiment, a function may be assigned to the controller wheel 73.

Figure 4B:
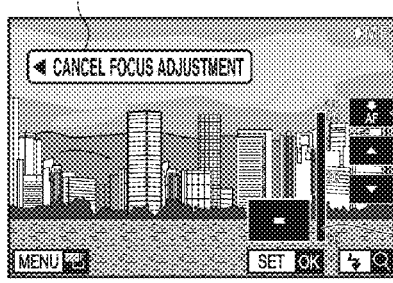
Figure 4F:
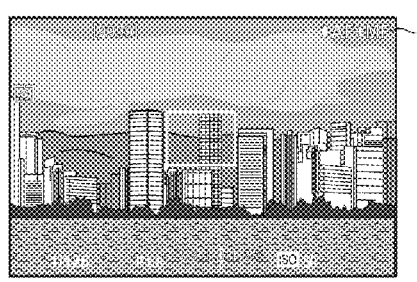
Figure 4C:
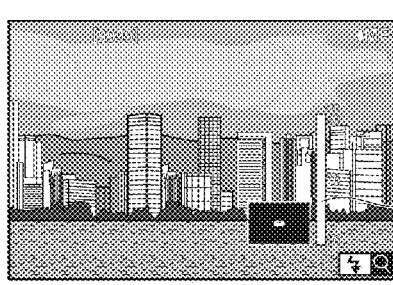
Figure 4G:
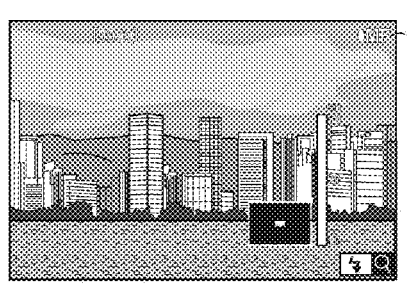
Figure 4D:
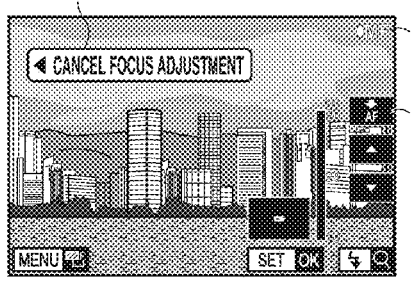
Figure 4H:
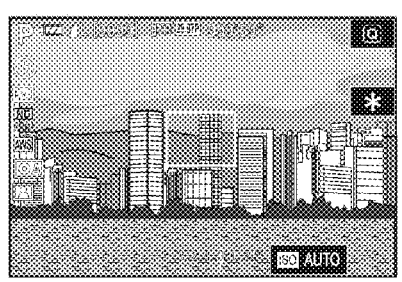

In step S308, the system control unit 50 records on the non-volatile memory 56 that the MF switching function is set to the ring function (hereinafter, the MF switching function assigned to the controller ring 74 is referred to as "ring MF function"). In the case where the ring MF function is enabled, an indication is presented that a focus can be adjusted manually (a focus position can be adjusted manually) by the user operating the controller ring 74, as specified by a guide 403 in FIG. 4A. FIGS. 4B to 4D each illustrate an example of a live view image in a case where the setting is switched from the AF mode to the MF mode using the ring MF function. In a case where the AF+MF function is enabled and the ring MF function is set, whether a screen among screens as illustrated in FIGS. 4B to 4D or a screen among screens as illustrated in FIGS. 4F to 4H is displayed is changed depending on the timing at which the controller ring 74 is rotated by a user. In other words, in a case where the controller ring 74 is operated before the image capturing preparation instruction, a live view screen as illustrated in FIGS. 4B to 4D is displayed. In a case where the controller ring 74 is operated during the image capturing preparation instruction, a live view screen as illustrated in FIGS. 4F to 4H is displayed.

In step S309, the system control unit 50 records on the non-volatile memory 56 that a function among other functions is set to the ring function.

In step S310, the system control unit 50 determines whether an instruction to change the focusing mode is issued. The focusing mode can be changed by the user selecting an item of the focusing mode on the menu screen. If the system control unit 50 determines that an operation to open the menu screen is performed and the item of the focusing mode is selected to give an instruction to change the focusing mode (YES in step S310), the processing proceeds to step S311. On the other hand, if the system control unit 50 determines that no instruction to change the focusing mode is issued (NO in step S310), the processing proceeds to step S314. Alternatively, an operation member for switching the focusing mode between the AF and MF modes may be provided, and the focusing mode may be switched by an operation on the operation member instead of the menu screen.

In step S311, the system control unit 50 determines whether the focusing mode is set to the MF mode. In response to the item of the focusing mode having been selected, the screen is further changed so that either the MF mode or the AF mode (focus adjustment setting method) can be selected. MF is a focusing method in which a focus position (object to be focused on, lens position) is determined according to the amount of a user operation, and the focus position can be changed according to an amount by which the controller ring 74 is rotated by the user. In the AF mode, control is performed to focus on an object selected by a user, a position at the center of an image capturing range, etc. in response to the image capturing preparation instruction (first shutter switch signal SW1) from the user or an AF instruction. In the AF mode, the lens is moved forward and backward to detect a difference (contrast) between light and dark on an object, and the lens is moved to focus on a position with a high contrast. In a case where continuous AF is set, control is performed to focus on a selected object. The AF may be performed with a phase difference AF method in which the lens unit 103 is controlled to displace the position thereof based on defocus amount information acquired from a captured image, so that phase difference AF is performed. If the system control unit 50 determines that the focusing mode is set to the MF mode (YES in step S311), the processing proceeds to step S312. If the system control unit 50 determines that the focusing mode is not set to the MF mode (the focusing mode is set to the AF mode) (NO in step S311), the processing proceeds to step S313.

In step S312, the system control unit 50 records on the non-volatile memory 56 that the focusing mode is set to the MF mode.

In step S313, the system control unit 50 records on the non-volatile memory 56 that the focusing mode is set to the AF mode.

In step S314, the system control unit 50 determines whether a ring MF flag described below is on. If the system control unit 50 determines that the ring MF flag is on (YES in step S314), the processing proceeds to step S315. If the system control unit 50 determines that the ring MF flag is not on (NO in step S314), the processing proceeds to step S318.

In step S315, the system control unit 50 displays a guide 404 for cancelling the ring MF function as illustrated in FIG. 4B. The guide 404 illustrated in FIG. 4B is indicates that pressing of the left button of the cross key (buttons located in left, right, top, and bottom positions in the controller wheel 73) can cancel the ring MF function to return to the AF mode. The guide 404 may be displayed for a limited period of time, such as six seconds or four seconds.

In step S316, the system control unit 50 determines whether the left button of the cross key is pressed. If the system control unit 50 determines that the left button of the cross key is pressed (YES in step S316), the processing proceeds to step S317. If the system control unit 50 determines that the left button of the cross key is not pressed (NO in step S316), the processing proceeds to step S318.

In step S317, the system control unit 50 switches the focusing mode to the AF mode and records on the non-volatile memory 56 that the focusing mode is switched to the AF mode.

In step S318, the system control unit 50 determines whether the controller ring 74 is rotated. If the system control unit 50 determines that the controller ring 74 is rotated (YES in step S318), the processing proceeds to step S319. If the system control unit 50 determines that the controller ring 74 is not rotated (NO in step S318), the processing proceeds to step S324.

In step S319, the system control unit 50 determines whether the MF switching function is assigned to the ring function. The system control unit 50 performs the determination by reference to the assignment to the ring function that is recorded on the non-volatile memory 56 in step S306 or the assignment to the ring function that is recorded on the non-volatile memory 56 before the start of processing of the still image mode. If the system control unit 50 determines that the MF switching is assigned to the ring function (YES in step S319), the processing proceeds to step S320. If the system control unit 50 determines that the MF switching is not assigned to the ring function (NO in step S319), the processing proceeds to step S323.

In step S320, the system control unit 50 determines whether the currently-set focusing mode is the AF mode. If the system control unit 50 determines that the currently-set focusing mode is the AF mode (YES in step S320), the processing proceeds to step S321. If the system control unit 50 determines that the currently-set focusing mode is not the AF mode (NO in step S320), the processing proceeds to step S322.

In step S321, the system control unit 50 records on the system memory 52 that the MF mode is set to the focusing mode, and turns on the ring MF flag. In a case where the focusing mode is the AF mode, and the MF switching function is assigned to the ring function, the focusing mode is switched to the MF mode when the controller ring 74 is rotated, as illustrated in FIG. 4B. A guide 402 in FIG. 4B indicates that the focus can be adjusted by operating the controller ring 74. A bar 406 indicates the focus position, and an index indicating the focus position in the bar 406 is changed according to the rotation of the controller ring 74 or a touch operation to move the index. An icon 405 is a touch button for receiving a touch, and, in response to the touch of the icon 405, focus adjustment with the AF function is performed in an area near the focus adjustment position with the MF function. The ring MF flag indicates that the focusing mode is switched from the AF mode to the MF mode by the rotation of the controller ring 74 during the image capturing standby period before the image capturing preparation instruction. In other words, the ring MF flag indicates that the focusing mode is switched from the AF mode to the MF mode by the ring function and that the focusing mode is switched, before execution of preparation for image capturing, to the MF mode by the user so that focus adjustment by not the AF but MF function can be performed. If the focusing mode is switched to the MF mode before an image capturing preparation instruction is issued, AF is not performed in response to the image capturing preparation instruction in step S327 (described below). More specifically, the user having switched the focusing mode to the MF mode before the image capturing preparation instruction is likely to have intended to prevent execution of the AF function in response to the image capturing preparation instruction and performing focus adjustment with the MF function even in the standby period or after issuance of the image capturing preparation instruction (the user wishes to avoid performing the AF adjustment in response to the image capturing preparation instruction).

In step S322, the system control unit 50 detects the amount of rotation of the controller ring 74 and changes the focus position (moves the lens position) by an amount corresponding to the detected amount of rotation. In a case where the controller ring 74 is rotated clockwise, the focus position is moved so as to focus on an object closer to the digital camera 100. On the other hand, in a case where the controller ring 74 is rotated counterclockwise, the focus position is moved so as to focus on an object further from the digital camera 100. Alternatively, the direction of rotation and the direction in which the focus is moved may be opposite directions. In this manner, focus adjustment is manually performed.

In step S323, the system control unit 50 executes another function set to the ring function in step S309.

In step S324, the system control unit 50 determines whether the shutter button 61 is half-pressed (i.e., whether the first shutter switch 62 is on). If the system control unit 50 determines that the shutter button 61 is half-pressed (YES in step S324), the processing proceeds to step S325. If the system control unit 50 determines that the shutter button 61 is not half-pressed (NO in step S324), the processing proceeds to step S328.

In step S325, the system control unit 50 determines whether the focusing setting is set to the MF mode. If the system control unit 50 determines that the focusing setting is set to MF (YES in step S325), the processing proceeds to step S326. If the system control unit 50 determines that the focusing setting is not set to MF (the focusing setting is set to the AF mode) (NO in step S325), the processing proceeds to step S327.

In step S326, the system control unit 50 performs AE control to set a diaphragm value and shutter speed to appropriate values. The focusing mode cannot be switched, so the guide 402 is continued to be displayed, as illustrated in FIG. 4C. Further, in a case where an image capturing preparation instruction is issued, the AF processing is not performed because the focusing mode is set to the MF mode before the issuance of the image capturing preparation instruction. The AE processing may not need to be performed based on the image capturing preparation instruction.

In step S327, the system control unit 50 performs the AF processing and the AE processing. Since it is determined in step S325 that the focusing mode is set to AF, not only AE processing but also AF processing are performed. More specifically, in a case where the user does not switch the focusing mode to the MF mode by rotating the controller ring 74 before step S324, the AF adjustment is performed in step S327. On the other hand, in a case where the user switches the focusing mode to the MF mode by rotating the controller ring 74, the AF adjustment is not performed in step S326. Further, in a case where the AF+MF function is enabled, a guide indicating that the AF+MF function is executable is displayed on the display unit 28, based on the image capturing preparation instruction having been issued, as specified by a guide 407 in FIG. 4F. The AF+MF function is executable after the issuance of the image capturing preparation instruction, so that in the case of the image capturing standby period illustrated in FIG. 4E, the guide 407 is not displayed on the display unit 28.

In step S328, the system control unit 50 determines whether to end the still image mode. Examples of an operation to end the still image mode include an operation to switch to the reproduction mode or an operation to turn off the power.

In step S329, the system control unit 50 determines, as in step S318, whether the controller ring 74 is rotated. If the controller ring 74 is rotated (YES in step S329), the processing proceeds to step S330. If the controller ring 74 is not rotated (NO in step S329), the processing proceeds to step S334.

In step S330, the system control unit 50 determines, as in step S325, whether the focusing setting is set to the MF mode. If the system control unit 50 determines that the focusing setting is set to MF (YES in step S330), the processing proceeds to step S333. If the system control unit 50 determines that the focusing setting is not set to MF (NO in step S330), the processing proceeds to step S331.

In step S331, the system control unit 50 determines whether the setting of the AF+MF function is enabled. If the system control unit 50 determines that the setting of the AF+MF function is enabled (YES in step S331), the processing proceeds to step S332. If the system control unit 50 determines that the setting of the AF+MF function is not enabled (NO in step S331), the processing proceeds to step S334.

In step S332, the system control unit 50 sets the focusing mode to the MF mode by the AF+MF function, records on the system memory 52 that the focusing mode is set to the MF mode, and turns on the AF+MF flag. Further, a guide indicating that the focusing mode is switched to the MF mode is displayed on the display unit 28, as specified by the guide 402 in FIG. 4G. In a case where the controller ring 74 is rotated in a state in which the image capturing preparation instruction is being issued (the state in which the first shutter switch signal SW1 is being generated, the state in which the shutter button 61 is half-pressed), the focusing mode is switched to the MF mode after the AF processing in step S327 has been completed. Further, in a case where the controller ring 74 is rotated after the image capturing preparation instruction (not during the image capturing standby period) has been issued, the user is likely to have intended to perform more precise focus adjustment after the focusing processing with the AF function is performed in order to achieve a focused state. More specifically, the user is likely to have intended to perform focus adjustment by temporarily using the MF function before execution of image capturing, i.e., the user is likely to have intended to perform more precise focus adjustment using the MF function after rough focus adjustment with the AF function. For the user having an intention of performing such focus adjustment, if the focusing mode is continued to be set to the MF mode even after the first shutter switch signal SW1 is cancelled, focusing processing that is performed when the user gives a next image capturing preparation instruction may not be intended focusing processing because focus adjustment with the AF function is not performed. More specifically, in a case where the next image capturing instruction is issued, if AF is not performed, the user needs to either perform focus adjustment with the MF function or perform an operation on the menu screen to set the focusing setting to the AF mode again. To prevent such operability deterioration, the AF+MF flag is turned on in the case where the focusing mode is switched to the MF mode by the rotation of the controller ring 74 after the issuance of the image capturing preparation instruction. In the case where the AF+MF flag is on, the focusing mode is switched to the AF mode in response to cancellation of the image capturing preparation instruction as described below in the description of step S339. At this time, the focusing mode recorded on the non-volatile memory 56 is still the AF mode. If the power is turned off and then turned on again at this time point, the focusing mode is set to the AF mode. In the case where the controller ring 74 is operated after the image capturing preparation instruction is issued, the display on the display unit 28 does not change regardless of whether the switch to the MF mode is performed with the AF+MF function or with the ring MF function. Further, in any of these cases, the focus position can be adjusted by operating the controller ring 74.

In step S333, the system control unit 50 detects, as in step S322, the amount of rotation of the controller ring 74 and changes the focus position (moves the lens position) by an amount corresponding to the detected amount of rotation. In other words, manual focus adjustment is performed.

In step S334, the system control unit 50 determines whether the shutter button 61 is completely pressed (i.e., whether the second shutter switch 64 is on). If the system control unit 50 determines that the shutter button 61 is completely pressed (YES in step S334), the processing proceeds to step S335. If the system control unit 50 determines that the shutter button 61 is not completely pressed (NO in step S334), the processing proceeds to step S336. When the shutter button 61 is completely pressed, the state in which the first shutter switch signal SW1 is being generated (state in which the image capturing preparation instruction is being issued) is changed to the state in which the second shutter switch signal SW2 is being generated (state in which the image capturing instruction is being issued). At this time, the completely-pressed state of the shutter button 61 is a state in which the shutter button 61 having been half-pressed is further pressed, so that in the determination in step S336 (described below) as to whether the half-pressed state (first shutter switch signal SW1) of the shutter button 61 is cancelled, it is determined that the first shutter switch signal SW1 is not cancelled yet.

In step S335, the system control unit 50 performs still-image capturing processing using the shutter 101, and records on the recording medium 200 an image captured by the image capturing unit 22. At this time, if the focusing mode is the AF mode, the image having undergone focus adjustment with AF is recorded, and if the focusing mode is the MF mode, the image having undergone focus adjustment by a user operation on the controller ring 74 is recorded.

In step S336, the system control unit 50 determines whether the half-pressed state of the shutter button 61 is cancelled (i.e., whether the first shutter switch 62 is no longer on). If the system control unit 50 determines that the half-pressed state is cancelled (YES in step S336), the processing proceeds to step S337. If the system control unit 50 determines that the half-pressed state is not cancelled (NO in step S336), the processing returns to step S329.

Steps S337 to S339 (described below) are the processes of determining whether to switch from the MF mode to the AF mode or remain in the MF mode in a case where the shutter button 61 in the half-pressed state is cancelled from the pressed state, and of setting the mode thereof, accordingly. In a case where the focusing mode is set to the AF mode in step S336, the focusing mode is continued to be set to AF with the shutter button 61 having been cancelled from the pressed state.

In step S337, the system control unit 50 determines whether the ring MF flag is turned on in step S321. If the ring MF flag is turned on (YES in step S337), the processing proceeds to step S338. If the ring MF flag is not turned on (NO in step S337), the processing proceeds to step S339.

In step S338, the system control unit 50 displays the guide 404 on the display unit 28, as in step S315, and the processing returns to step S301. In this case, the setting is the MF mode before the cancellation of the first shutter switch signal SW1, and the MF mode is maintained even after the cancellation of the first shutter switch signal SW1.

In step S339, the system control unit 50 determines whether the AF+MF flag is turned on in step S332. If the AF+MF flag is turned on in step S332 (YES in step S339), the processing proceeds to step S340. If the AF+MF flag is not turned on in step S332 (NO in step S339), the processing proceeds to step S301 (the focusing mode is maintained). In the case where the AF+MF flag is turned on, the focusing mode is switched from the AF mode to the MF mode by operating the controller ring 74 after the image capturing preparation instruction is issued, so that the user is likely to have intended to perform the MF adjustment for a temporary period immediately before execution of image capturing, or the user is likely to have intended not to perform all the focus adjustment with MF only but to perform precise focus adjustment with the MF function immediately before execution of image capturing after the focus adjustment with the AF function. Thus, if it is determined in step S339 that the AF+MF flag is turned on in step S332, processing to return the focusing mode to the AF mode is performed in steps S340 and S341.

In step S340, the system control unit 50 changes the focusing mode recorded on the system memory 52 from the MF mode to the AF mode and then records that the focusing mode is the AF mode. Further, as illustrated in FIG. 4H, since the image capturing preparation instruction is cancelled, the guide 402 on the display unit 28 is hidden (the same display form as in the standby period before the image capturing preparation instruction). Since the focusing mode is switched from the AF mode to the MF mode by the user operating the controller ring 74 after the image capturing preparation instruction is issued, the focusing mode is returned to the AF mode when the image capturing preparation instruction is cancelled. In this way, the focusing mode is switched to the MF mode by the operation of the controller ring 74 after the image capturing preparation instruction issued immediately before the image capturing instruction, so that if the focusing mode is switched to AF again at the same time as the issuance of the cancellation of the image capturing preparation instruction, the user does not have to perform an operation to return the focusing mode to the AF mode and thus can move to the next image capturing. In the case where focus adjustment is performed using the AF+MF function, unless the half-pressed state of the shutter button 61 is cancelled, image capturing can be performed again and again each time the shutter button 61 is completely pressed, either in a set focus state or while precise focus adjustment with the MF function is being performed. Accordingly, in the case where the user releases the shutter button 61 from the pressed state, the user is likely to intend to end the series of image capturing (including capturing of a single image), so the focusing mode is returned to the AF mode at this timing. More specifically, the focusing mode is set to the MF mode during a period from the time point at which the user starts operating the controller ring 74 to the time point at which the series of image capturing is ended, whereby focus adjustment with the MF function can be performed during the temporary period of time before execution of image capturing. If the focusing mode is switched to AF in response to the shutter button 61 having been half-pressed state after the completely-pressed state of the shutter button 61 is cancelled, AF is set each time image capturing processing is performed, so that the user cannot perform precise focus adjustment while checking a result of captured image in capturing an image. Accordingly, the focusing mode is set to the AF mode when the press of the shutter button 61 is cancelled (when the half-pressed state is cancelled) (when the user is to end the series of operations in the current focus state), whereby the user can easily perform more precise focus adjustment during the series of image capturing. When the power of the digital camera 100 is turned on, the focusing mode recorded on the non-volatile memory 56 is loaded into the system memory 52, and the system memory 52 is read so that processing of the focusing mode is performed. At this time, focusing mode information stored on the system memory 52 is recorded again in the case where the focusing mode has been switched. More specifically, in the case where the focusing mode has been switched to the MF mode by the user operating the controller ring 74 before or after issuance of the image capturing preparation instruction, information indicating that the switch to MF is recorded on the system memory 52. At this time, whether the focusing mode is switched to the MF mode with the ring MF function or with the AF+MF function is also recorded at the same time, and in the case where the focusing mode is switched with the ring MF function, the focusing mode is not to be returned to the AF mode even with the first shutter switch signal SW1 being cancelled.

In step S341, the system control unit 50 turns off the AF+MF flag.

According to the above-described exemplary embodiment, a user can switch the focusing mode from the AF mode to the MF mode even in the image capturing standby period or after issuance of the image capturing preparation instruction. Further, in the case where the user intends to set the focusing mode to the MF mode for a temporary period of time before execution of image capturing, the user can temporarily switch the focusing mode to the MF mode. Accordingly, the focusing mode can be switched to the MF mode for a period of time which further meets the user intention. In the case where the focusing mode is switched from the AF mode to the MF mode by the user operating the controller ring 74 during the image capturing standby period, the focusing mode is continued to be set to the MF mode even after the image capturing preparation instruction is cancelled. Further, in the case where the focusing mode is switched from the AF mode to the MF mode by the user operating the controller ring 74 after the image capturing preparation instruction is issued, the focusing mode is returned to the AF mode in response to the cancellation of the image capturing preparation instruction. Since the user can switch the focusing mode from the AF mode to the MF mode by operating the controller ring 74 during the image capturing standby period or after the image capturing preparation instruction, the user does not have to operate the operation member considering whether to set the MF mode temporarily or to keep the MF mode, so that the operation can be performed smoothly.

While the processing in the still image mode is described in the above-described exemplary embodiment, the switching from the AF mode to the MF mode using the controller ring 74 can also be performed in the moving image mode. In the case of the moving image mode according to the present exemplary embodiment, there is no state of the image capturing preparation instruction, and recording is started when the image capturing instruction is issued, so the AF+MF function is disabled. In the case where the focusing mode is switched from the AF mode to the MF mode by the user operating the controller ring 74 during the recording of a moving image, the focusing mode remains in the MF mode even after the recording is ended.

After the image capturing preparation instruction is issued in step S324, focusing processing may be continued until the image capturing instruction is issued or the focusing mode is switched to the MF mode, or focusing processing may be performed once in response to the image capturing preparation instruction.

Further, while the switching between the AF and MF modes for focus adjustment is described in the present exemplary embodiment, this is not a limiting case, and an exemplary embodiment of the present disclosure is also applicable to the setting of shutter speed, diaphragm, or ISO sensitivity. In other words, an exemplary embodiment of the present disclosure is also applicable to a case of switching between manual setting in which the setting is changed according to the amount of a user operation on the controller ring 74 and automatic setting in which an image captured by the image capturing unit is analyzed to automatically perform a setting, besides the setting of focus adjustment.

Further, after the ring MF flag is turned on, the ring MF flag is turned off in the following cases: a case where the focusing mode is returned to the AF mode in step S317; a case where the focusing mode is set to the AF mode in step S313; a case where another function is set to the ring function in step S309; and a case where the power is turned off. In a case where the power is turned off and then turned on, the focusing mode is set to the AF mode. Further, in a case where the focusing mode is set to the MF mode in step S312 (on the menu screen), the ring MF flag is turned off so that the focusing mode cannot be returned to the AF mode easily by the operation in step S316. Alternatively, after the ring MF flag is turned on, the ring MF flag may be turned off and the focusing mode may be returned to the AF mode when a predetermined time or longer passes such as one hour or three hours. In this way, in a case where the focusing mode is set to the MF mode with the ring MF function, the focusing mode can be returned to the AF mode without an operation to return the focusing mode to the AF mode on the menu screen, unlike the case where the focusing mode is switched to the MF mode with an operation performed on the menu screen.

In a case where the focusing mode is switched to the MF mode with the ring MF function, the focusing mode setting on the non-volatile memory 56 and the system memory 52 may be set to the MF mode, and in a case where the focusing mode is switched to the MF mode with the AF+MF function, the focusing mode may be set again on the system memory 52. In other words, in a case where the focusing mode is switched to the MF mode with the ring MF function, the MF mode may remains when the power is turned off and then turned on again.

The above-described various control performed by the system control unit 50 may be performed by one hardware device, or a plurality of hardware devices may share the processing to control the apparatus.

Further, while the present disclosure has been described in detail with reference to exemplary embodiments, it is to be understood that the disclosure is not limited to the disclosed exemplary embodiments, and various forms within the spirit of the present disclosure are also encompassed within the scope of the present disclosure. Further, it is to be noted that the above-described exemplary embodiments are mere examples for implementing the present disclosure and can be combined as desired.

Further, while the case in which an exemplary embodiment of the present disclosure is applied to the digital camera 100 is described as an example in the above-described exemplary embodiment, this is not a limiting case, and an exemplary embodiment of the present disclosure is applicable to any apparatus capable of controlling focus adjustment. Specifically, an exemplary embodiment of the present disclosure is applicable to a personal computer (PC), mobile phone terminal, mobile image viewer, digital photo frame, music player, game machine, electronic book reader, tablet PC, smartphone, etc. An exemplary embodiment of the present disclosure is also applicable to an apparatus, such as a smartphone, tablet PC, or desk top PC, configured to receive a live view image captured by a digital camera, etc. via wired or wireless communication, display the received live view image, and remotely control the digital camera (including a network camera).

Other Embodiments

Embodiments of the present disclosure can also be realized by execution of the following processing. Specifically, software (program) for realizing the functions of the above-described exemplary embodiment is supplied to a system or apparatus via a network or recording medium, and a computer (or central processing unit (CPU), micro processing unit (MPU), etc.) of the system or apparatus reads and executes program codes. In this case, the program and the recording medium storing the program are also encompassed within the scope of the present disclosure.

According to an exemplary embodiment of the present disclosure, a specific setting relating to image capturing can be set by a manual operation during a period which further meets a user intention.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-020166, filed Feb. 4, 2016, which is hereby incorporated by reference herein in its entirety.

What is claimed is:

1. An image capturing control apparatus configured to switch between a first setting mode in which a specific setting relating to image capturing is automatically performed and a second setting mode in which the specific setting is performed based on an amount of a user operation performed on a first operation member, the image capturing control apparatus comprising:
 a reception unit configured to receive an image capturing preparation instruction to prepare for image capturing; and
 a control unit configured to perform control in such a manner that the first setting mode is switched to the second setting mode based on a user operation,
 wherein, in a case where the first setting mode is switched to the second setting mode by a user operation before the reception unit receives the image capturing preparation instruction, the control unit performs control in such a manner that the second setting mode is not switched to the first setting mode when the reception unit is released from a state of receiving the image capturing preparation instruction, and
 wherein, in a case where the first setting mode is switched to the second setting mode by a user operation in a state of the reception unit receiving the image capturing preparation instruction, the control unit performs control in such a manner that the second setting mode is switched to the first setting mode when the reception unit is released from the state of receiving the image capturing preparation instruction.

2. The image capturing control apparatus according to claim 1, wherein the control unit performs control to switch from the first setting mode to the second setting mode based on a specific operation either in one of a state the image capturing preparation instruction is accepted and a state in which the image capturing preparation instruction is being received.

3. The image capturing control apparatus according to claim 2, wherein the specific operation is an operation performed on the first operation member.

4. The image capturing control apparatus according to claim 1, wherein the specific setting is a focus setting.

5. The image capturing control apparatus according to claim 1, wherein the specific setting is any of a shutter speed setting, a diaphragm setting, and an International Organization for Standardization (ISO) sensitivity setting.

6. The image capturing control apparatus according to claim 1, wherein, in a case where the specific setting is the first setting mode, the control unit performs control in such a manner that the specific setting is performed in the first setting mode when the image capturing preparation instruction is issued.

7. The image capturing control apparatus according to claim 1, wherein the image capturing preparation instruction is issued when a shutter button provided separately from the first operation member is pressed to a predetermined pressed state in which the shutter button is in the middle of completely pressed.

8. The image capturing control apparatus according to claim 7,
 wherein an image capturing instruction is issued based on the shutter button having been completely pressed, and
 wherein, in a case where the specific setting is the first setting mode, the control unit performs control in such a manner that the specific setting is not performed in the first setting mode even in a case where the shutter button is pressed to the predetermined pressed state after the image capturing instruction is issued.

9. The image capturing control apparatus according to claim 1, wherein the control unit performs control to, based on the specific setting having been switched from the first setting mode to the second setting mode, display a guide indicating that the second setting mode has been set.

10. The image capturing control apparatus according to claim 1, wherein the control unit performs control to, in a case where the image capturing preparation instruction is issued without the first setting mode being switched to the second setting mode by a user operation before the image capturing preparation instruction is issued, display a guide indicating that a user can switch to the second setting mode during a period from a time point at which an operation on the first operation member is performed to a time point at which the image capturing preparation instruction is not issued.

11. The image capturing control apparatus according to claim 1, wherein, in a case where the first setting mode is switched to the second setting mode by a user operation before the image capturing preparation instruction is issued, the control unit performs control in such a manner that the second setting mode is switched to the first setting mode based on a user operation performed after the image capturing preparation instruction is cancelled.

12. The image capturing control apparatus according to claim 1, wherein, in a case where a first setting relating to a setting mode of the specific setting is set, the control unit performs control in such a manner that the first setting mode is switched to the second setting mode based on an operation performed on the first operation member before the image capturing preparation instruction, and, in a case where the first setting is not set, the control unit performs control in such a manner that the first setting mode is not switched to the second setting mode even in a case where an operation is performed on the first operation member before the image capturing preparation instruction.

13. The image capturing control apparatus according to claim 12, wherein, in a case where a second setting relating to the setting mode of the specific setting is enabled, the control unit performs control in such a manner that the specific setting in the second setting mode is set based on an operation having been performed on the first operation member after the specific setting in the first setting mode is set, and in a case where the second setting is disabled, the control unit performs control in such a manner that the specific setting in the second setting mode is not set even in a case where an operation on the first operation member is performed after the specific setting in the first setting mode is set.

14. The image capturing control apparatus according to claim 12, wherein, in a case where the first setting is set and the second setting is enabled, the control unit performs control in such a manner that, in a case where the first setting mode is switched to the second setting mode by a user operation before the reception unit receives the image capturing preparation instruction, the second setting mode is not switched to the first setting mode even when the reception unit is released from the state in which the image capturing preparation instruction is being received, and
wherein in a case where the first setting mode is switched to the second setting mode by a user operation in a state in which the reception unit is receiving the image capturing preparation instruction, the control unit performs control in such a manner that the second setting mode is switched to the first setting mode based on the reception unit having been released from the state in which the image capturing preparation instruction is being received.

15. The image capturing control apparatus according to claim 12, wherein, in a case where the first setting is set, the control unit displays a guide indicating that the specific setting in the second setting mode is set by a user operation before the image capturing preparation instruction.

16. The image capturing control apparatus according to claim 1, further comprising a recording unit configured to record that a setting mode of the specific setting is the first setting mode or the second setting mode,
wherein the control unit performs control in such a manner that, in a case where the first setting mode is switched to the second setting mode before the reception unit receives the image capturing preparation instruction, the setting mode to be recorded on the recording unit is switched to the second setting mode, and in a case where the first setting mode is switched to the second setting mode after the image capturing preparation instruction is received, the setting mode to be recorded on the recording unit is not switched to the second setting mode.

17. The image capturing control apparatus according to claim 1, wherein the first operation member is a rotatable member.

18. A method for controlling an image capturing control apparatus configured to switch between a first setting mode in which a specific setting relating to image capturing is automatically performed and a second setting mode in which the specific setting is performed based on an amount of a user operation performed on a first operation member, the method comprising:
receiving an image capturing preparation instruction to prepare for image capturing; and
performing control in such a manner that the first setting mode is switched to the second setting mode based on a user operation,
wherein, in a case where the first setting mode is switched to the second setting mode by a user operation before the image capturing preparation instruction is received in the receiving, the control is performed in such a manner that the second setting mode is not switched to the first setting mode even in a case where a state in which the image capturing preparation instruction is being received in the receiving is released, and
wherein, in a case where the first setting mode is switched to the second setting mode by a user operation in a state in which the image capturing preparation instruction is being received in the receiving, the control is performed in such a manner that the second setting mode is switched to the first setting mode based on release from the state in which the image capturing preparation instruction is being received in the receiving.

19. A non-transitory computer-readable storage medium storing a program for executing the method according to claim 18.

* * * * *